US011151281B2

(12) United States Patent
Lai (10) Patent No.: US 11,151,281 B2
(45) Date of Patent: Oct. 19, 2021

(54) VIDEO MONITORING METHOD FOR MOBILE ROBOT

(71) Applicant: AMICRO SEMICONDUCTOR CO., LTD., Guangdong (CN)

(72) Inventor: Qinwei Lai, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 0 days.

(21) Appl. No.: 16/647,030

(22) PCT Filed: Aug. 6, 2018

(86) PCT No.: PCT/CN2018/098913
§ 371 (c)(1),
(2) Date: Mar. 13, 2020

(87) PCT Pub. No.: WO2019/085568
PCT Pub. Date: May 9, 2019

(65) Prior Publication Data
US 2020/0257821 A1   Aug. 13, 2020

(30) Foreign Application Priority Data
Oct. 30, 2017 (CN) .......................... 201711036022.3

(51) Int. Cl.
*G06F 21/62* (2013.01)
*G06T 7/73* (2017.01)
(Continued)

(52) U.S. Cl.
CPC .......... *G06F 21/6245* (2013.01); *G06F 16/29* (2019.01); *G06F 16/787* (2019.01);
(Continued)

(58) Field of Classification Search
CPC .... G06F 16/29; G06F 16/787; G06F 21/6245; G06K 9/00664; G06T 2207/30244;
(Continued)

(56) References Cited

U.S. PATENT DOCUMENTS

| 7,805,220 B2 * | 9/2010 | Taylor | ................. G05D 1/0219 700/253 |
| 2005/0018879 A1 * | 1/2005 | Ito | .................... G08B 13/19608 382/103 |

(Continued)

FOREIGN PATENT DOCUMENTS

| CN | 103179378 A | 6/2013 |
| CN | 104038740 A | 9/2014 |

(Continued)

*Primary Examiner* — Thai Q Tran
*Assistant Examiner* — Stephen R Smith
(74) *Attorney, Agent, or Firm* — Yu Gang (57) ABSTRACT

The disclosure relates to a video monitoring method for mobile robot. The method includes the following steps: providing one or more private area on a basis of a map constructed by a mobile robot; determining, on a basis of a position of the mobile robot and an image shot from a shooting angle of a camera, whether an image shot currently contains private contents; if the image shot currently contains private contents, shielding the private contents contained in the image; and if the image shot currently is not containing private contents, continuing monitoring the mobile robot. By providing one or more private area in a map constructed by a mobile robot, the mobile robot can determine whether a shot image contains private contents during the subsequent video monitoring process, so as to shield the private contents in the image, thereby ensuring the security in video monitoring of the mobile robot, and avoiding privacy leakage.

8 Claims, 4 Drawing Sheets

(51) Int. Cl.
- *G06F 16/787* (2019.01)
- *G06F 16/29* (2019.01)
- *G06K 9/00* (2006.01)
- *H04N 5/247* (2006.01)
- *H04N 5/765* (2006.01)
- *H04N 7/18* (2006.01)

(52) U.S. Cl.
CPC ............ *G06K 9/00664* (2013.01); *G06T 7/73* (2017.01); *H04N 5/247* (2013.01); *H04N 5/765* (2013.01); *H04N 7/18* (2013.01); *G06T 2207/30244* (2013.01)

(58) Field of Classification Search
CPC .......... G06T 7/73; H04N 5/232; H04N 5/247; H04N 5/765; H04N 7/18; H04W 4/02
USPC ................... 348/148, 143; 382/103; 700/253
See application file for complete search history.

(56) References Cited

U.S. PATENT DOCUMENTS

| | | | |
|---|---|---|---|
| 2006/0192853 A1* | 8/2006 | Lee ................. | G08B 13/19686 348/143 |
| 2009/0015670 A1* | 1/2009 | Gopinath ......... | G08B 13/19686 348/143 |
| 2019/0036887 A1* | 1/2019 | Miller ..................... | G06F 21/62 |
| 2019/0061157 A1* | 2/2019 | Suvarna ............... | G05D 1/0263 |
| 2019/0258737 A1* | 8/2019 | Wang ..................... | G06F 16/29 |
| 2019/0272830 A1* | 9/2019 | Fujii ....................... | G10L 25/60 |
| 2019/0318106 A1* | 10/2019 | Yu ....................... | H04N 21/4405 |
| 2020/0150655 A1* | 5/2020 | Artes .................... | G05D 1/0016 |
| 2020/0348666 A1* | 11/2020 | Han ..................... | A47L 9/2857 |

FOREIGN PATENT DOCUMENTS

| | | |
|---|---|---|
| CN | 105791751 A | 7/2016 |
| CN | 106598052 A | 4/2017 |
| CN | 107566743 A | 1/2018 |
| JP | 2016203276 A * | 12/2016 |

* cited by examiner

VIDEO MONITORING METHOD FOR MOBILE ROBOT

CROSS-REFERENCE TO RELATED APPLICATIONS

The present disclosure claims priority to Chinese Patent Application No. 201711036022.3, entitled "Video Monitoring Method for Mobile Robot", filed on 30, Oct. 2017, the contents of which are hereby incorporated by reference in their entirety.

TECHNICAL FIELD

The disclosure relates to the technical field of robots, and more particularly, to a video monitoring method for mobile robot.

BACKGROUND

Existing video monitoring devices are generally fixed. A minority of video monitoring devices has a holder, which can perform 360-degree rotation monitoring. The monitoring devices will not move and can only shoot nearby scenes. With the development of a mobile robot technology, robots may position and move autonomously, and video monitoring devices may be installed to greatly expand monitoring applications. For example, this type of robot may be used as a patrol robot, which can cover large factories and public places, thereby avoiding monitor dead angles, etc. This type of robot usually has video information always open, and will always record video. Images will be stored and circulated in digital storage. Therefore, there is a risk of being snooped on privacy.

SUMMARY

A video monitoring method for mobile robot may include the following steps. One or more private area is provided on a basis of a map constructed by a mobile robot. On a basis of a position of the mobile robot and an image shot from a shooting angle of a camera, it is determined whether an image shot currently contains private contents. If the image shot currently contains private contents, the private contents contained in the image is shielded. If the image shot currently is not containing private contents, monitoring the mobile robot is continued.

DETAILED DESCRIPTION OF THE EMBODIMENTS

The Detailed Description of the Embodiments of the disclosure is further described below with reference to the accompanying drawings.

A mobile robot in the disclosure mainly refers to a mobile intelligent robot equipped with a camera and capable of video monitoring. The mobile robot is an intelligent household appliance, which can automatically perform mobile monitoring on certain occasions by virtue of certain artificial intelligence. A mobile robot body is equipped with various sensors that may detect a walking distance, a walking angle, a body status, an obstacle and the like. If encountering a wall or other obstacles, it will turn on its own and walk in different routes according to different settings for planned video monitoring. The mobile robot (referred to as a mobile robot for short) according to the disclosure includes the following structure: a mobile robot body capable of autonomous walking with driving wheels. A human-machine interaction interface and a camera are provided on the body, and an obstacle detection unit is provided on the body. There is an inertial sensor inside the body. The inertial sensor includes an accelerometer and a gyroscope. The driving wheel is provided with an odometer (usually a code disk) for detecting the driving distance of the driving wheel. A control module capable of processing parameters of related sensors and outputting a control signal to an execution member is also provided.

Figure 1:
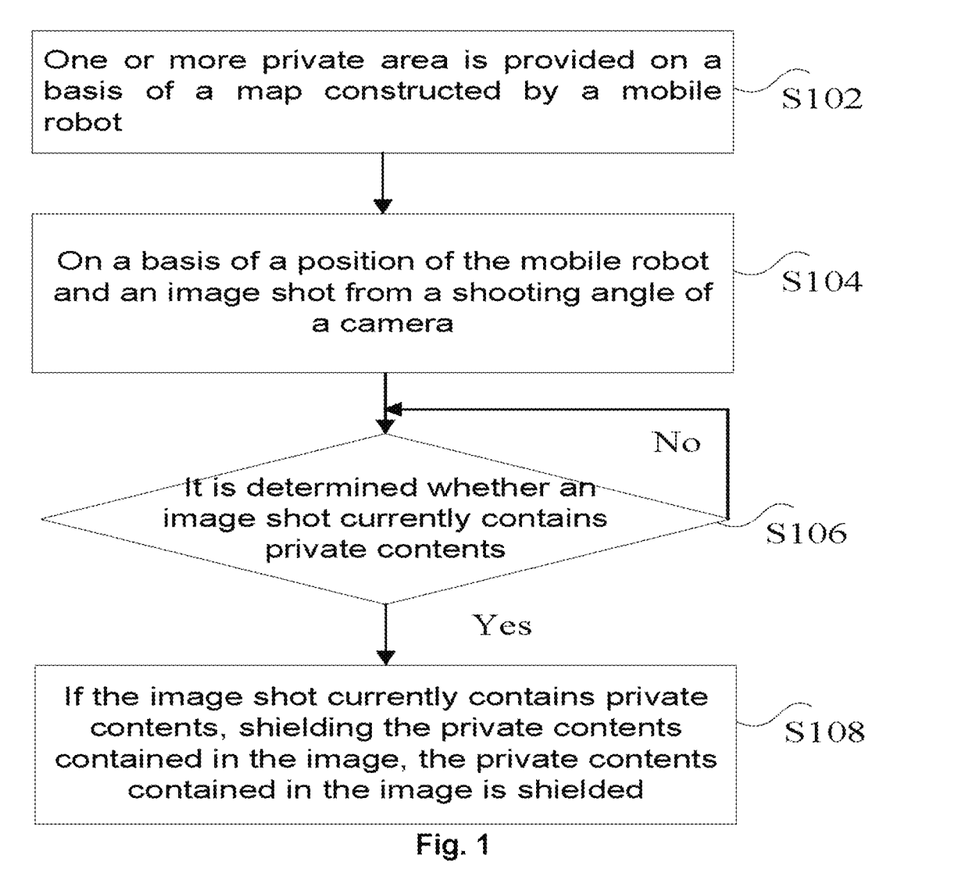
FIG. 1 is a flowchart of a video monitoring method for mobile robot according to the disclosure.

As shown in FIG. 1, a video monitoring method for mobile robot of the disclosure includes the following steps:

S102: One or more private area is provided on a basis of a map constructed by a mobile robot.

S104: On a basis of a position of the mobile robot and an image shot from a shooting angle of a camera.

S106: It is determined whether an image shot currently contains private contents.

S108: If the image shot currently contains private contents, shielding the private contents contained in the image, the private contents contained in the image is shielded.

If the image shot currently is not containing private contents, monitoring the mobile robot is continued.

According to the disclosure, by providing one or more private area in a map constructed by a mobile robot, the mobile robot can determine whether a shot image contains private contents during the subsequent video monitoring process, so as to shield the private contents in the image, thereby ensuring the security in video monitoring of the mobile robot, and avoiding privacy leakage.

Preferably, the operation that one or more private area is provided on a basis of a map constructed by a mobile robot includes the following steps. A map is constructed. The map is displayed to a control terminal. A range defined of the control terminal in the map is determined. The defined range is used as the one or more private area.

At present, the mobile robot needs to traverse the area completely when constructing the map, which means that a motion trajectory of the mobile robot needs to traverse the area to the greatest extent. The full traversal path planning is divided into a random coverage method and a path planning method. The path planning method may also adopt an artificial potential field method, a grid method, a template model method, a fuzzy control algorithm, a neural network path planning method, and a genetic algorithm. With the algorithms, the mobile robot may construct a complete map. After the map is constructed, the mobile robot may send relevant map data to a control terminal (a smart phone or a tablet computer, etc.), and the control terminal receives the map data and displays the map. At this time, a user may define a certain area on the displayed map as an area to be kept secret by operating a smart terminal. The smart terminal sends the defined range information to the mobile robot, and the mobile robot will mark the defined area range as one or more private area, convenient for subsequent privacy processing. There may be multiple ranges defined by the user, and by the autonomous selection of the user for the one or more private area, different needs can be met, and the intelligence and practicability of the mobile robot can be improved.

Preferably, the operation that one or more private area is provided on a basis of a map constructed by a mobile robot includes the following steps. A map is constructed. An instruction for providing one or more private area is received. An external navigation instruction is received, the mobile robot walks according to the external navigation instruction, and a walking path is recorded. A range defined by the walking path and corresponding to the map is used as one or more private area.

At present, the mobile robot needs to traverse the area completely when constructing the map, which means that a motion trajectory of the mobile robot needs to traverse the area to the greatest extent. The full traversal path planning is divided into a random coverage method and a path planning method. The path planning method may also adopt an artificial potential field method, a grid method, a template model method, a fuzzy control algorithm, a neural network path planning method, and a genetic algorithm. With the algorithms, the mobile robot may construct a complete map. After the map is constructed, when the mobile robot receives an instruction for providing one or more private area from a remote control device or an operation panel, it is determined whether an external navigation instruction (a navigation instruction from a remote control or a smart phone, etc.) has been received. If yes, the mobile robot walks according to the external navigation instruction, and a walking path is recorded. When the walking path constitutes a closed circle, a range corresponding to the closed circle in the map is used as one or more private area. If no, a next instruction is needed. In this way, the user can directly control the walking of the mobile robot to define the private range, the one or more private area of the user is more intuitively reflected and provided, the operation needs of different users are met, and the practicability of the mobile robot is improved.

Preferably, the operation that it is determined whether an image shot currently contains private contents on a basis of a position of the mobile robot and an image shot from a shooting angle of a camera includes the following steps. A current position and a current direction of the mobile robot in the map are determined on the basis of positioning data of the mobile robot. On the basis of the current position and the current direction, a shooting area covered by the shooting angle of the camera of the mobile robot in the map is determined. It is determined whether the shooting area contains the one or more private area. If the shooting area is not containing the one or more private area, it is determined that an image shot currently does not contain private contents. If the shooting area contains the one or more private area, it is determined that an image shot currently contains private contents.

Figure 2:
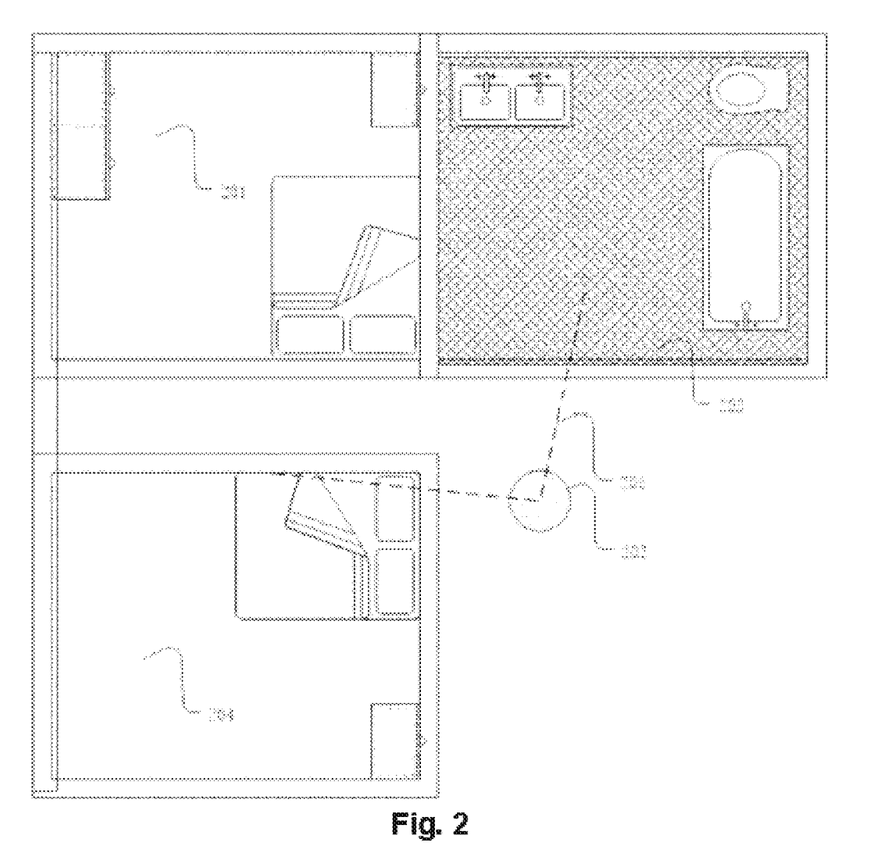
FIG. 2 is a schematic diagram of video monitoring of a mobile robot in a house according to the disclosure.

As shown in FIG. 2, this figure is only a schematic diagram used to represent a map environment. In the figure, a position 202 is a current position of the mobile robot. An angle formed by two dashed lines 205 is a shooting angle of a camera. The shooting angle is known. Different types of cameras have different shooting angles. The shooting area covered by the shooting angle is an area within the two dashed lines in the figure. The dashed line shown may continue to extend to both sides, and only a short section is shown in the figure. In FIG. 2, a master room 201, a guest room 204 and a toilet 203 are shown. The toilet 203 is provided as one or more private area. When the mobile robot is at the position 202, the shooting range includes a part of the one or more private area (that is, a grid area on the left side of the dashed line 205 after extending the dashed line 205), so the camera may shoot the scene in the toilet 203. At this time, it is determined that an image shot currently contains private contents. The scene in the bathroom needs to be shielded.

Figure 3:
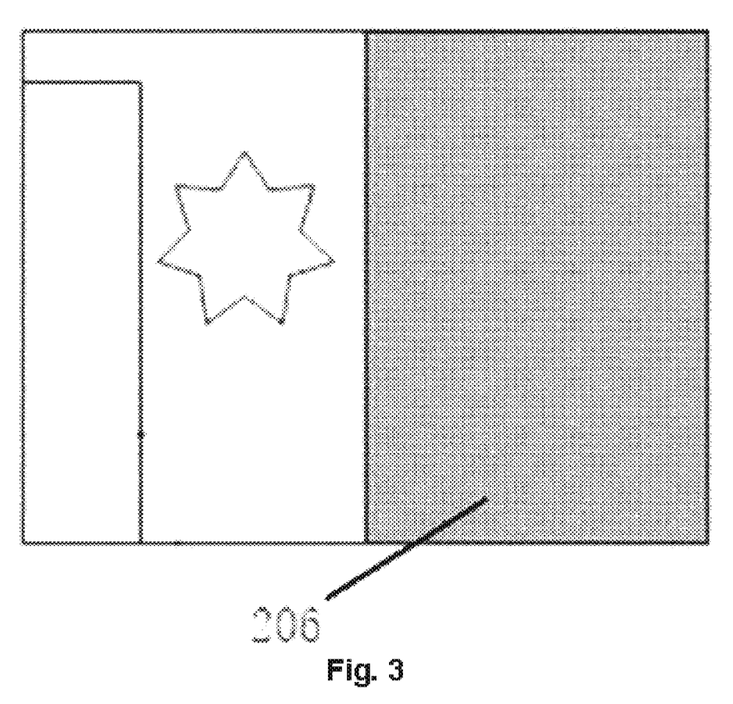
FIG. 3 is a schematic diagram of an image shot by the mobile robot in FIG. 2.

The image shown in FIG. 3 is the image shot by the mobile robot in FIG. 2. A gray portion 206 is the content corresponding to the shielded private area. The operation that a current position and a current direction of the mobile robot in the map are determined on the basis of positioning data of the mobile robot may be implemented in various ways, such as detecting the walking direction of the mobile robot by a gyroscope, detecting the walking distance of the mobile robot by an odometer, and determining the current position and a current direction of the mobile robot by the gyroscope and the odometer. In addition, the current position and a current direction of the mobile robot may also be determined by laser positioning, ultra-wideband wireless positioning, or visual navigation positioning. Of course, the above several modes may be used in combination to improve the accuracy of positioning and navigation.

Preferably, the operation that it is determined whether an image shot currently contains private contents on a basis of a position of the mobile robot and an image shot from a shooting angle of a camera includes the following steps. A current position and a current direction of the mobile robot in the map are determined on the basis of positioning data of the mobile robot. On the basis of the current position, it is determined whether the mobile robot is in the one or more private area. If the mobile robot is in the one or more private area, it is determined that an image shot currently contains private contents. If the mobile robot is not in the one or more private area, on the basis of the current position and the current direction, a shooting area covered by the shooting angle of the camera of the mobile robot in the map is determined. It is determined whether the shooting area contains the one or more private area. If the shooting area contains the one or more private area, it is determined that an image shot currently contains private contents. If the shooting area is not containing the one or more private area, it is determined that an image shot currently does not contain private contents.

As shown in FIG. 2, if the mobile robot enters the toilet 203, it is determined that the mobile robot is in the one or more private area. At this time, it indicates that all the content captured by the mobile robot is private contents. It may be directly determined that the image shot currently contains the private contents and needs to be shielded, thereby improving the image data processing efficiency of the mobile robot. Only when the mobile robot is not in the one or more private area, it is necessary to further determine whether the shooting area covered by the shooting angle of the camera in the map contains the one or more private area as in the above implementation manner. The subsequent implementation manners are the same as the above implementation manner, and will not be repeated herein.

Preferably, the operation that the private contents contained in the image is shielded includes the following steps. A shooting angle of the camera is determined, two edges corresponding to the shooting angle being a first shooting angle edge and a second shooting angle edge, the first shooting angle edge corresponding to a first outermost edge on one side of the image, and the second shooting angle edge corresponding to a second outermost edge on the other side of the image. A maximum shielding angle within the shooting angle formed when the one or more private area contained in the shooting area is projected to the camera is determined, two edges corresponding to the maximum shielding angle being a first shielding angle edge and a second shielding angle edge respectively. On a basis of a first shielding line in the image corresponding to the first shielding angle edge and a second shielding line in the image corresponding to the second shielding angle edge, it is determined that the private contents contained in the image is a content between the first shielding line and the second shielding line. The content between the first shielding line and the second shielding line is shielded.

There are also many shielding modes, such as mosaicing at the positions where shielding is required, or covering the positions where shielding is required with a pure grayscale image.

The basis of a first shielding line in the image corresponding to the first shielding angle edge and a second shielding line in the image corresponding to the second shielding angle edge includes the following steps. An XY axis coordinate system is established with the position of the camera as an origin, coordinates of the origin being (X0, Y0). A shooting angle of the camera is determined as ω. An angle between a shooting direction of the camera and an X axis is determined as α, the shooting direction being an angle bisector direction of the shooting angle. Coordinates of a point of intersection between the first shielding angle edge of the maximum shielding angle and the one or more private area are determined as (X1, Y1) and coordinates of a point of intersection between the second shielding angle edge of the maximum shielding angle and the one or more private area are determined as (X2, Y2). An angle between the first shielding angle edge and the X axis is determined as β, β=arctan((Y1−Y0)/X1−X0)), and an angle between the first shooting angle edge and the first shielding angle edge is obtained as θ1, θ1=β−(α−(ω/2))=β−α+0.5ω. An angle between the second shielding angle edge and the X axis is determined as δ, δ=arctan((Y2−Y0)/(X2−X0)), and an angle between the first shooting angle edge and the second shielding angle edge is obtained as θ2, θ2=δ−(α−(ω/2))=δ−α+0.5ω. The length of the image is determined as L, the first shielding line in the image corresponding to the first shielding angle edge being a parallel line with a vertical distance L*(θ1/ω) from the first outermost edge, and the second shielding line in the image corresponding to the second shielding angle edge being a parallel line with a vertical distance L*(θ2/ω) from the first outermost edge. α is detected by a gyroscope of the mobile robot.

Figure 4:
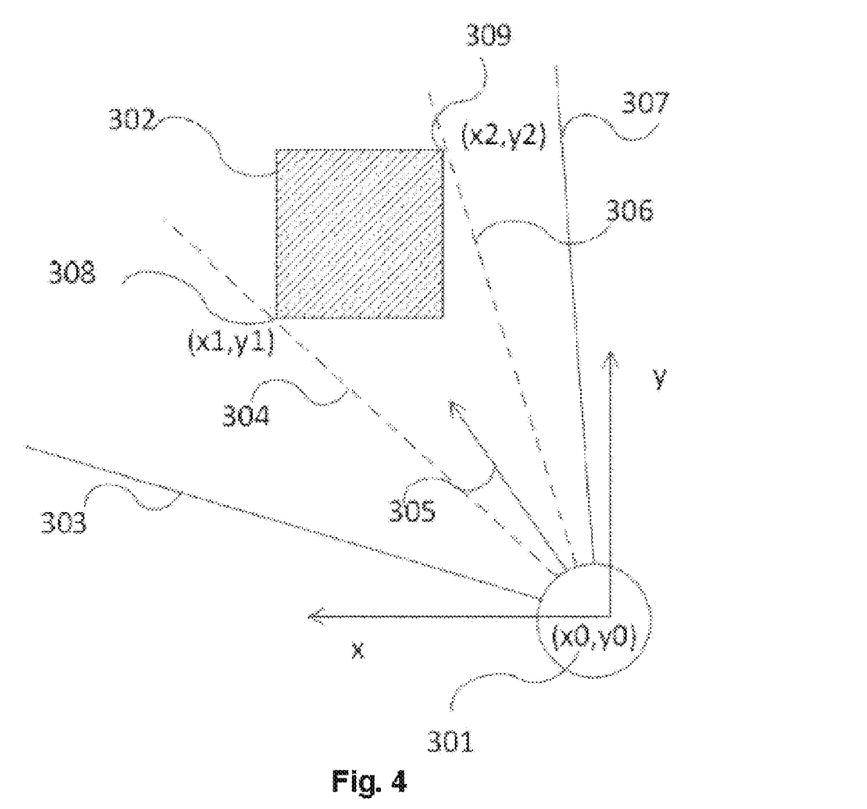
FIG. 4 is a schematic analysis diagram of robot video monitoring according to the disclosure.

FIG. 4 is taken as an example for description. The angle between the lines in FIG. 4 is only for reference and is not an accurate measurement angle. The position 301 is the position where the camera is located. This position is used as an origin to establish an XY axis coordinate system, the coordinates of the origin being (X0=0, Y0=0). An angle formed by a first shooting angle edge 303 and a second shooting angle edge 307 is a shooting angle of the camera ω, ω=71°. A shooting direction 305 of the camera is an angle bisector direction of the first shooting angle edge 303 and the second shooting angle edge 307. That is, an angle between a shooting direction 305 and the first shooting angle edge 303 is 35.5°, and an angle between a shooting direction 305 and the second shooting angle edge 307 is also 35.5°. At this time, the gyroscope of the mobile robot detects that the current shooting direction (that is, the angle between the line 305 and the X axis) is 45.5°. A square area 302 with a diagonal pattern is one or more private area that needs to be shielded (that is, the private area as a shielding area). A dashed line 304 is the first shielding angle edge, and a dashed line 306 is the second shielding angle edge. The coordinates of a point of intersection 308 between the first shielding angle edge and the private areas are (X1=20, Y1=20). The coordinates of a point of intersection 309 between the second shielding angle edge and the one or more private areas are (X2=10, Y2=30). It can be seen that the angle between the first shielding angle edge and the X axis is β, and β=arctan((Y1−Y0)/(X1−X0))=arctan((20−0)/(20−0))=Arctan1=45°. The angle between the second shielding angle edge and the X axis is δ, and δ=arctan((Y2−Y0)/(X2−X0))=arctan((30−0)/(10−0))=Arctan3=71°. The angle between the first shooting angle edge and the first shielding angle edge is obtained as θ1, θ1=β−(α−(w/2))=β−α+0.5ω=45°−45.5°+0.5*71°=35°. The angle between the first shooting angle edge and the second shielding angle edge is obtained as θ2, θ2=δ−(α−(w/2))=δ−α+0.5ω=71°*45.5°+0.5*71°=61°.

Figure 5:
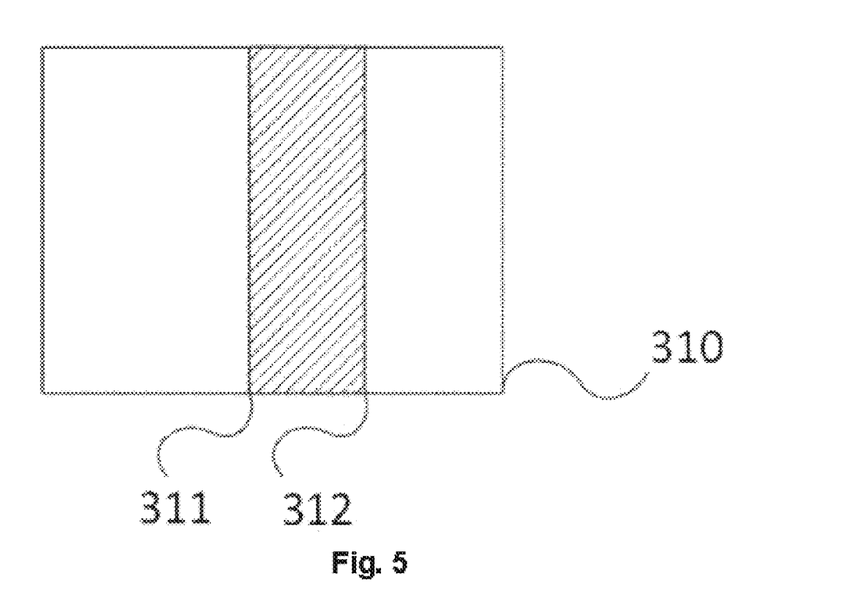
FIG. 5 is a schematic diagram of an image shot by the mobile robot in FIG. 4.

As shown in FIG. 5, the image shot by the camera in FIG. 4 is shown. The line 311 in the image 310 is a line corresponding to the first shielding angle edge (that is, the first shielding line), the line 312 in the image is a line corresponding to the second shielding angle edge (that is, the second shielding line), and the content between the first shielding line and the second shielding line is the shielded content. It is assumed that the length of the image 310 is L=10 cm. On the basis of the ratio of the shooting angle ω occupied by θ1 in FIG. 4, a vertical distance between the first shielding line and the first outermost side on the left side of the image is) L*(θ1/ω)=10*(35°/71°=4.93 cm, and a vertical distance between the second shielding line and the first outermost side on the left side of the image is) L*(θ2/ω)=10*(61°/71°=8.59 cm. Therefore, the private contents that needs to be shielded finally is determined as an area covered by diagonal lines in FIG. 5, that is, an area between the lines 311 and 312. The line 311 is 4.93 cm from the leftmost edge of the image, and the line 312 is 8.59 cm from the leftmost edge of the image.

Preferably, after the private contents contained in the image is shielded, the method further includes the following steps. Data coding is performed on the image with the shielded private contents. Coded data is sent to a memory for storage or to a display for display. By coding an image with a shielded private area and then storing or displaying the image, the data security can be improved and the problem of privacy leakage caused by data theft can be avoided.

Preferably, the operation that one or more private area is provided on a basis of a map constructed by a mobile robot further includes the following step of setting voice privacy. An instruction for instructing whether to perform voice privacy is received. If the instruction for instructing is to perform voice privacy, the mobile robot is not allowed to perform voice recording, a shot video recorded by the mobile robot is not having voice. If the instruction for instructing is not to perform voice privacy, the mobile robot is allowed to perform voice recording, a shot video recorded by the mobile robot is having voice. By means of the step of setting voice privacy, users can make corresponding settings according to actual needs to further protect user privacy and avoid the risk of some important voice information being leaked.

Preferably, the mobile robot includes two cameras, one camera is configured for image analysis processing, and the other camera is configured for video recording, a recorded video shielding the private contents. By using two cameras to work at the same time, the image data processing efficiency of the mobile robot can be improved.

The above embodiments are only sufficient disclosure rather than limitation of the disclosure, and any replacement of equivalent technical features based on the creative spirit of the disclosure without creative labor shall be regarded as the scope disclosed in this application.

What is claimed is:

1. A video monitoring method for mobile robot, comprising the following steps:
   providing one or more private area on a basis of a map constructed by a mobile robot;
   determining, on a basis of a position of the mobile robot and an image shot from a shooting angle of a camera, whether an image shot currently contains private contents;
   when the image shot currently contains private contents, shielding the private contents contained in the image;
   wherein shielding the private contents contained in the image comprises the following steps:
   determining a shooting angle of the camera, two edges corresponding to the shooting angle being a first shooting angle edge and a second shooting angle edge, the first shooting angle edge corresponding to a first outermost edge on one side of the image, and the second shooting angle edge corresponding to a second outermost edge on the other side of the image; determining a maximum shielding angle within the shooting angle formed when the one or more private area contained in the shooting area is projected to the camera, two edges corresponding to the maximum shielding angle being a first shielding angle edge and a second shielding angle edge respectively; determining, on the basis of the first shielding line in the image corresponding to the first shielding angle edge and a second shielding line in the image corresponding to the second shielding angle edge, that the private contents contained in the image is a content between the first shielding line and the second shielding line; and shielding the content between the first shielding line and the second shielding line;
   wherein the basis of a first shielding line in the image corresponding to the first shielding angle edge and a second shielding line in the image corresponding to the second shielding angle edge comprises the following steps:
   establishing an XY axis coordinate system with the position of the camera as an origin, coordinates of the origin being (X0, Y0); determining a shooting angle of the camera as $\omega$; determining an angle between the shooting direction of the camera and an X axis as $\alpha$, the shooting direction being an angle bisector direction of the shooting angle;
   determining coordinates of a point of intersection between the first shielding angle edge of the maximum shielding angle and the one or more private area as (X1, Y1) and coordinates of a point of intersection between the second shielding angle edge of the maximum shielding angle and the one or more private area as (X2, Y2); determining an angle between the first shielding angle edge and the X axis as $\beta$, $\beta=\arctan((Y1-Y0)/X1-X0))$, and obtaining an angle between the first shooting angle edge and the first shielding angle edge as $\theta1$, $\theta1=\beta-(\alpha-(\omega/2))=\beta-\alpha+0.5\omega$; determining an angle between the second shielding angle edge and the X axis as $\delta$, $\delta=\arctan((Y2-Y0)/(X2-X0))$, and obtaining an angle between the first shooting angle edge and the second shielding angle edge as $\theta2$, $\theta2=\delta-(\alpha-(\omega/2))=\delta-\alpha+0.5\omega$; and determining the length of the image as L, the first shielding line in the image corresponding to the first shielding angle edge being a parallel line with a vertical distance $L*(\theta1/\omega)$ from the first outermost edge, and the second shielding line in the image corresponding to the second shielding angle edge being a parallel line with a vertical distance $L*(\theta2/\omega)$ from the first outermost edge.

2. The method according to claim 1, wherein providing one or more private area on a basis of a map constructed by a mobile robot comprises the following steps:
   constructing the map;
   displaying the map to a control terminal;
   determining a range defined of the control terminal in the map; and
   using the defined range as the one or more private area.

3. The method according to claim 1, wherein providing the one or more private area on the basis of the map constructed by the mobile robot comprises the following steps:
   constructing the map;
   receiving an instruction for providing one or more private area;
   receiving an external navigation instruction, controlling the mobile robot to walk according to the external navigation instruction, and recording a walking path; and
   using a range defined by the walking path as the one or more private area, wherein the range defined by the walking path is corresponding to a range in the map.

4. The method according to claim 1, wherein determining, on the basis of the position of the mobile robot and the shooting angle of the camera, whether the image shot currently contains private contents comprises the following steps:
   determining a current position and a current direction of the mobile robot in the map on the basis of positioning data of the mobile robot;
   determining, on the basis of the current position and the current direction, a shooting area covered by the shooting angle of the camera of the mobile robot in the map;
   determining whether the shooting area contains the one or more private area;
   if the shooting area is not containing the one or more private area, determining that an image shot currently does not contain private contents; and
   if the shooting area contains the one or more private area, determining that an image shot currently contains private contents.

5. The method according to claim 1, wherein determining, on the basis of the position of the mobile robot and the shooting angle of the camera, whether the image shot currently contains private contents comprises the following steps:
   determining the current position and the current direction of the mobile robot in the map on the basis of positioning data of the mobile robot;
   determining, on the basis of the current position, whether the mobile robot is in the one or more private area;
   if the mobile robot is in the one or more private area, determining that an image shot currently contains private contents;
   if the mobile robot is not in the one or more private area, determining, on the basis of the current position and the current direction, a shooting area covered by the shooting angle of the camera of the mobile robot in the map;

determining whether the shooting area contains the one or more private area;

if the shooting area contains the one or more private area, determining that an image shot currently contains the private contents; and if the shooting area is not containing the one or more private area, determining that an image shot currently does not contain the private contents.

6. The method according to claim 1, wherein after shielding the private contents contained in the image, the method further comprises the following steps:

performing data coding on the image with the shielded private contents; and sending coded data to a memory for storage or to a display for display.

7. The method according to claim 1, wherein providing one or more private area on a basis of a map constructed by a mobile robot further comprises the following steps of setting voice privacy:

receiving an instruction for instructing whether to perform voice privacy;

if the instruction for instructing is to perform voice privacy, not allowing the mobile robot to perform voice recording, a shot video recorded by the mobile robot is not having voice; and if the instruction for instructing is not to perform voice privacy, allowing the mobile robot to perform voice recording, the shot video recorded by the mobile robot is having voice.

8. The method according to claim 1, wherein the mobile robot comprises two cameras, one camera is configured for image analysis processing, and the other camera is configured for video recording, a recorded video shielding the private contents.

* * * * *